(12) United States Patent
Krol et al.

(10) Patent No.: US 6,351,586 B1
(45) Date of Patent: Feb. 26, 2002

(54) WAVELENGTH DEPENDENT PHASE DELAY DEVICE

(75) Inventors: Mark F Krol; Yongqian Liu, both of Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/473,665

(22) Filed: Dec. 29, 1999

(51) Int. Cl.$^7$ ................................................. G02B 6/26
(52) U.S. Cl. ............................ 385/39; 385/37; 385/42; 385/29
(58) Field of Search ............................ 385/37, 39, 41, 385/47, 29, 30, 42

(56) References Cited

U.S. PATENT DOCUMENTS

| | | |
|---|---|---|
| 4,900,119 A | 2/1990 | Hill et al. |
| 5,940,556 A | 8/1999 | Moslehi et al. |
| 6,011,881 A * | 1/2000 | Moslehi et al. ............... 385/37 |
| 6,212,315 B1 * | 4/2001 | Doerr ........................... 385/24 |
| 6,221,565 B1 * | 4/2001 | Jain et al. ...................... 385/8 |

FOREIGN PATENT DOCUMENTS

EP 0943939 A1 3/1999

* cited by examiner

*Primary Examiner*—Darren Schuberg
*Assistant Examiner*—Fayez Assaf
(74) *Attorney, Agent, or Firm*—Mary Y. Redman

(57) ABSTRACT

A Mach-Zehnder device includes a delay element in one arm which delays propagation of light at a first wavelength relative to propagation of light at a second wavelength. The delay element may be made up of a grating having a period which causes coupling of the first wavelength from a first mode into a second mode. In another aspect, the invention includes a second grating positioned downstream from the first grating and having a period which causes coupling of the portion of light from the second propagation mode back into the first propagation mode. Also disclosed is an optical waveguide in which light at a wavelength $\lambda$ can propagate in at least a first and a second mode. The waveguide has an effective index of refraction $n_1$ with respect to the first propagation mode of $\lambda$, and an effective index of refraction $n_2$ with respect to the second propagation mode. A grating formed in said waveguide and having a period approximately equal to $(\lambda/2)(n_1-n_2)$.

5 Claims, 1 Drawing Sheet

WAVELENGTH DEPENDENT PHASE DELAY DEVICE

BACKGROUND OF THE INVENTION

1. Field of the Invention

The present invention relates generally to the field of optical devices for imparting or using phase delays and gratings, and more particularly, to Mach-Zehnder interferometer devices with fiber gratings.

2. Technical Background

Fiber optic Wavelength Division Multiplexed (WDM) networks carry information in multiple wavelength channels. WDM networks need mechanisms for adding and dropping channels. This is done through Wavelength Add/Drop Multiplexers commonly known as WADM's. It is highly desirable in WDM networks to have the capability to partially alter the traffic at each repeater by adding and/or dropping one or several service channels while leaving the remainder of channels to propagate unchanged. There is considerable interest in using optical WADM's to implement add/drop functionality for reconfigurable and transparent networks.

One approach to WADM architecture uses multiplexers or demultiplexers, known as MUX or DEMUX devices, to add or drop the desired channels. MUX/DEMUX devices, however, often have relatively large insertion losses and high front end costs. These are drawbacks to their use in many applications.

Another approach to implement WADM architectures uses fiber Bragg gratings to select the add/drop channel. In general, fiber Bragg gratings reflect light of a wavelength equal to 2n Λ (where n is the index of refraction of the waveguide and Λ is the grating period), while other wavelengths propagate through unchanged. One approach to a WADM architecture based on fiber Bragg gratings includes a Mach-Zehnder interferometer with a fiber Bragg grating in each arm. In this approach, grating position and period must be closely matched to tight tolerances to achieve the interferometric effect that leads to the add/drop function. This results in high manufacturing costs.

What is needed is an optical device that makes possible a WADM architecture that is relatively low cost, and that can be implemented in a device that is relatively easy to manufacture.

SUMMARY OF THE INVENTION

One aspect of the present invention is a Mach-Zehnder device with first and second waveguiding arms. The input ends of the first and second arms are coupled, and likewise the output ends are coupled. A delay element in the first arm delays propagation of light at a first wavelength relative to propagation of light at a second wavelength. In another aspect, the invention includes a delay element made up of a grating having a period which causes coupling of the first wavelength from a first mode into a second mode.

In another aspect, the invention includes an apparatus that can impart a phase delay to a portion of an optical signal of a predetermined wavelength. This embodiment includes an optical waveguide that can propagate light at that wavelength in first and second propagation modes. A grating in the waveguide has a period that causes the portion of the light at that wavelength to couple from the first into the second propagation mode. In another aspect, the invention includes a second grating in the waveguide positioned downstream from the first grating and having a period which causes coupling of the portion of light from the second propagation mode back into the first propagation mode.

In another aspect, the invention includes an optical waveguide in which light at a wavelength $\lambda$ can propagate in at least a first and a second mode. The waveguide has an effective index of refraction $n_1$ with respect to the first propagation mode of $\lambda$, and an effective index of refraction $n_2$ with respect to the second propagation mode. A grating formed in said waveguide and having a period approximately equal to $(\lambda/2)(n_1-n_2)$.

In another aspect, the invention includes a grating having a period that is a function of a variable physical parameter of the grating. This parameter may be, for example, temperature or strain.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
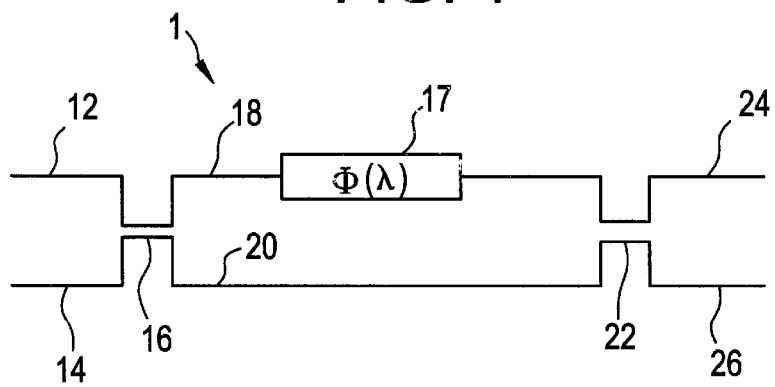
FIG. 1 is a schematic diagram of an add-drop filter according to an embodiment of the invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the device of the present invention is shown in FIG. 1, and is designated generally throughout by reference numeral 10.

Referring to FIG. 1, a Mach-Zehnder interferometer (MZI) device 10 includes a first input waveguide 12, and a second input waveguide 14, which feed optical signals to a first coupler 16. The first coupler 16 which, in an exemplary embodiment may be a commercially available 3dB coupled-mode directional coupler, combines the input signal and added channel, and splits them between the first and second arms 18, 20 of the MZI device 10. The coupler 16 imparts a phase delay of $\pi/2$ to light which undergoes coupling as it passes through the coupler, relative to light which passes through uncoupled. A delay element 17 is provided in the first arm 18. The delay element 17 imparts a wavelength-dependent delay to light propagating therethrough, delaying propagation of light at a first wavelength relative to propagation of light at a second wavelength. In this manner, it imparts a phase change, which varies with wavelength.

A second coupler 22 combines the signals which propagate through the first and second arms 18, 20 respectively, and splits the combined signal between a first output waveguide 24 and second output waveguide 26. In an exemplary embodiment, the second coupler 22 may be identical to the first coupler 16. The waveguides that make up the input and output waveguides and the arms of the MZI may be optical waveguiding fiber. Alternatively, the MZI device 10 may be formed of planar waveguides and suitable planar coupled-mode directional couplers.

In an exemplary embodiment used as an add-drop device, the input signal would be input through the first input waveguide 12, and a channel to be added would be input through the second input waveguide 14. In this embodiment, the dropped channel would be directed to the second output waveguide 26.

The MZI device 10 can be used to add or drop channels by changing the phase of a portion of the signal propagating through a first arm 18 relative to the phase of that propagating through the second arm 20, according to the following equations:

$$P_{out}(\lambda_m) \cos^2[\Delta\Phi(\lambda_m)],$$

and $$P_{drop}(\lambda_d) \sin^2[\Delta\Phi(\lambda_d)],$$

where $P_{out}(\lambda_m)$ is the power of the output signal at wavelengths $\lambda_m$, $P_{drop}(\lambda_d)$ is the drop in power at a wavelength $\lambda_d$, respectively, and $\Delta\Phi(\lambda_m)$ and $\Delta\Phi(\lambda_d)$ are the phase differences for the signal at wavelengths $\lambda_m$ and $\lambda_d$, respectively.

$P_{drop}$ can be maximized by choosing $\Delta\Phi(\lambda_d)$ so that it is equal to $n\pi/2$ where n is an odd integer. $P_{out}$ will be maximized when $\Delta\Phi(\lambda_m)$ is equal to zero. This will result in a channel with wavelength equal to $\lambda_{drop}$ being dropped, while the remainder of the multi-channel signal remains unchanged.

Figure 2:
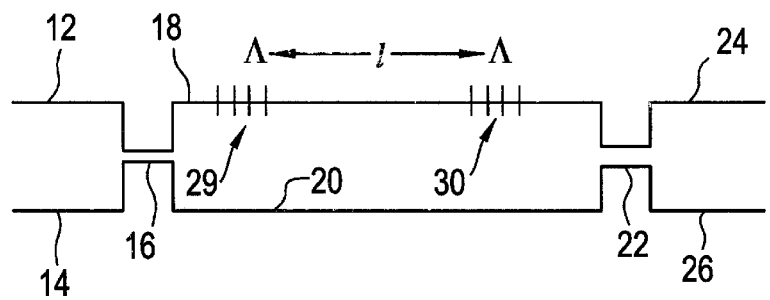
FIG. 2 is a schematic diagram of an add-drop filter according to another embodiment of the invention.

In the illustrated exemplary embodiment, the first arm 18 of the MZI 10 imparts a phase change to the signal that is a function of wavelength. As illustrated in FIG. 2, this wavelength-dependent phase change may be provided by a pair of gratings 29, 30 separated by a distance l within the waveguide that forms the first arm of the MZI device 10. Each grating 29, 30 is characterized by a period $\Lambda_1$, $\Lambda_2$, respectively. In the illustrated embodiment, the first arm of the MZI device 10 is made up of optical fiber. Suitable fiber is capable of propagating an optical signal in at least a first and second order mode, and more preferably in at least a first, second and third order mode. A suitable fiber may be chosen so that the first mode (which may be the lowest order or fundamental mode) and the mode to which the first grating will couple a signal will have a good overlap integral. Preferably, the fiber will be chosen for the best overlap integral.

The period of the first grating $\Lambda_1$ is selected so as to couple light at wavelength $\lambda$ from a first order mode into a second order mode, and $\Lambda_2$, the period of the second grating, is selected so as to couple light at the same wavelength $\lambda$ propagated in the second order mode back into the first order mode. In a waveguide with substantially no change in refractive indices along its length, other than the gratings themselves, $\Lambda_1$ will equal $\Lambda_2$. The gratings may be formed by any well-known process for forming waveguide gratings such as, for example, writing the grating with a pattern of UV radiation.

Figure 3:
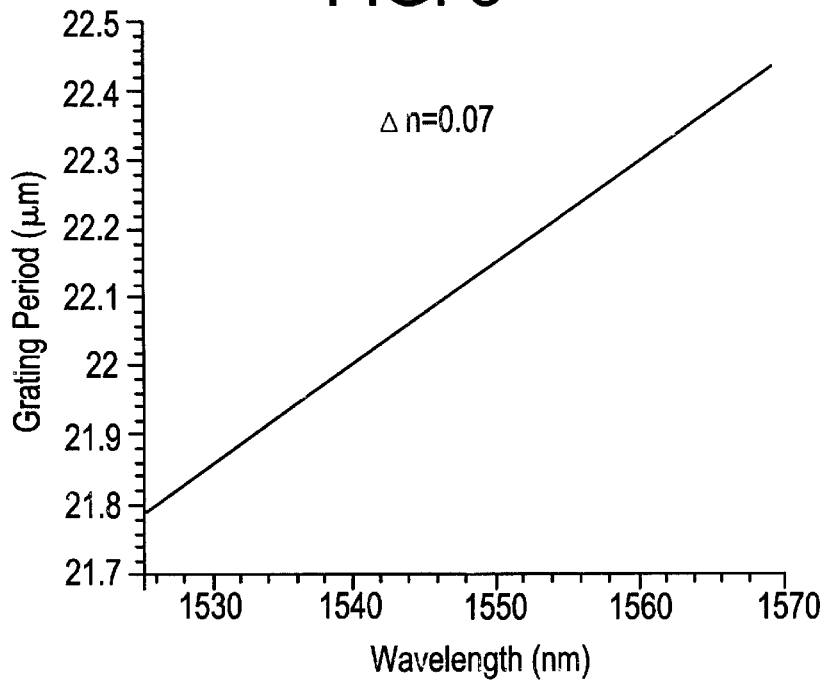
FIG. 3 is a graph of grating period which meets the phase matching condition plotted as a function of wavelength.

Since different modes propagate as if traveling through optical paths of differing effective length, this results in a phase change. The phase difference at wavelength $\lambda_o$ is given by:

$$\Delta\Phi(\lambda_o) = (\beta_1 - \beta_2)l,$$

where $\beta_1$ and $\beta_2$ are the propagation constants for the first and second order modes, respectively, and l is the optical path length between the output end of the first grating and the input end of the second grating. The mode coupling is most efficient when the two modes are coupled at the phase matching condition, $$\beta_1 - \beta_2 = 2\pi/\Lambda,$$

where $\Lambda$ is the period of the gratings. The propagation constant of these two modes are determined by the effective refractive indices of these two modes. Where fiber is used as the waveguide, this will depend on the specific fiber design. FIG. 3 shows a plot of the grating period which meets the phase matching condition plotted as a function of wavelength assuming a $\Delta n$ (i.e., $n_1 - n_2$) of about 0.07, which would be typical for multimode optical fiber. Varying the period of the gratings will allow for the variable selection of the add/drop channel. A fiber with larger grating period variations across the tuning range will allow for accurate and narrow channel selection.

From the above formula, it is desirable that the length of the fiber between the two gratings should satisfy $$l = (2n+1)\Lambda/4,$$

where n is an integer. Multimode fiber of a type available commercially may be used in the illustrated embodiment. For applications where it would be desirable to minimize the overall size of the device, a suitable fiber can be designed by choosing materials with $\beta_1$ and $\beta_2$ values that result in a relatively small value l.

The WADM architecture described here can be implemented with a fixed first and second grating for a fixed wavelength WADM or with the first, the second or both gratings being provided as tunable gratings. This allows the variable selection of add/drop channel. The gratings may be tuned by, for example, changing a physical parameter of the waveguide such as temperature or strain.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An apparatus for imparting a phase delay to a portion of an optical signal having a predetermined wavelength, comprising:

an optical waveguide adapted to propagate light at said wavelength in a first propagation mode and a second propagation mode therethrough;

a first grating in said waveguide having a period which causes light at said wavelength to couple from the first propagation mode to the second propagation mode; and a second grating in said fiber positioned downstream from said first grating and having a period which causes coupling of light at said wavelength from said second propagation mode to said first propagation mode.

2. The apparatus of claim 1, wherein said first grating has a period $\Lambda$ and light that is coupled into said second mode has a wavelength $\lambda$ determined by the period $\Lambda$ of said first grating.

3. The apparatus of claim 2, wherein $\lambda$ and $\Lambda$ are related by the equation $$\Lambda=\lambda/2(n_1-n_2),$$

where $n_1$ is the effective index of refraction of the waveguide with respect to the first mode, and $n_2$ is the effective index of refraction of the waveguide with respect to the second mode.

4. The apparatus of claim 3 wherein said grating period $\Lambda$ is a function of a variable physical characteristic of the grating.

5. The apparatus of claim 1 wherein said wave guide is an optical waveguiding fiber.

* * * * *